Oct. 23, 1945.　　　P. B. REEVES　　　2,387,609
VARIABLE SPEED UNIT
Filed Sept. 13, 1943
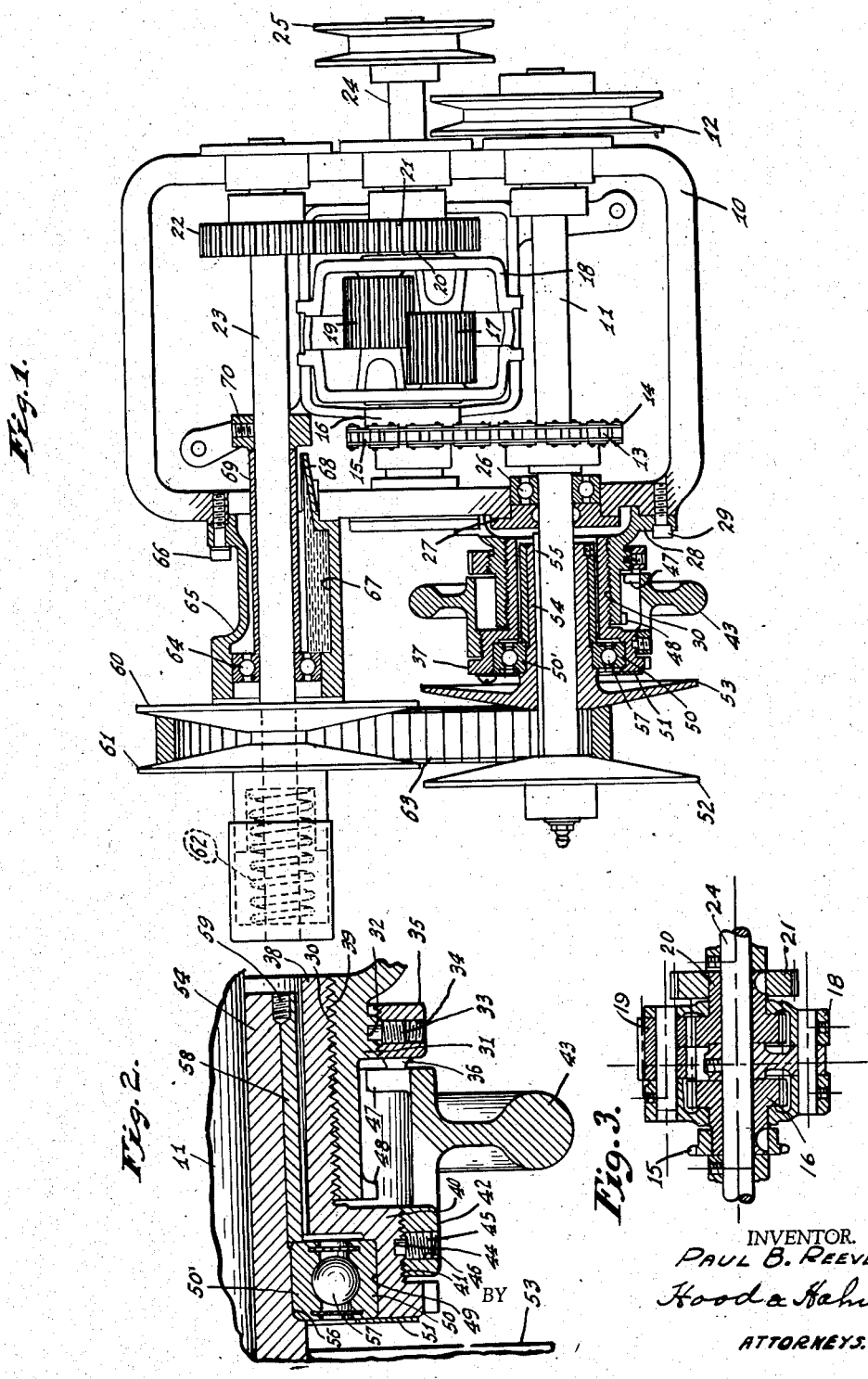
INVENTOR.
PAUL B. REEVES,
Hood & Hahn
ATTORNEYS.

Patented Oct. 23, 1945

2,387,609

UNITED STATES PATENT OFFICE 2,387,609

VARIABLE-SPEED UNIT

Paul B. Reeves, Columbus, Ind., assignor to Reeves Pulley Company, Columbus, Ohio, a corporation of Indiana Application September 13, 1943, Serial No. 502,140

6 Claims. (Cl. 74—230.17)

The present invention relates to a variable speed unit, and more particularly, the invention is concerned with such a unit which combines a belt driven variable speed transmission of the variable-effective-diameter pulley type with a differential unit, whereby adjustment of the pulley type transmission from one limit of its adjustment to the other limit thereof will result in a variation in the operation of the output shaft of the combined unit from maximum speed in one direction through zero speed to maximum speed in the opposite direction. A further object of the invention is to provide, in a variable speed transmission of the V-pulley type, a positive adjusting mechanism of improved and simplified structure, including means for variably limiting the opposite ends of the throw of the adjustable element of such a transmission, without danger of jamming the adjusting mechanism.

Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is an elevational view of my invention, parts being shown in section for clarity of illustration;

Fig. 2 is an enlarged fragmental sectional view of the adjusting and stop mechansim; and Fig. 3 is a section through the differential mechanism.

Referring more particularly to the drawing, it will be seen that I have illustrated a housing 10 in which is journalled an input shaft 11. In the illustrated embodiment of my invention, I have shown a V-pulley 12 carried by the shaft 11 outside the housing 10 to receive power from an outside source; but it will be obvious that the shaft 11 may be driven in any desired manner, as, for instance, by direct connection to the spindle of a motor.

Within the oil filled casing 10, the shaft 11 carries a sprocket 13 which, through a chain 14, drives a sprocket 15 loosely mounted upon the output shaft 24 of the unit, and drivingly connected to a first differential gear 16. Said gear 16 meshes with a differential pinion 17 carried, upon an axis eccentric to the shaft 24, by a differential cage or carrier 18 which is fixed to the shaft 24. A second differential pinion 19, carried upon the carrier 18 and meshing with the pinion 17, meshes also with a second differential gear 20 drivingly connected to a gear 21, said gears 20 and 21 being loosely mounted on the shaft 24, and said gear 21 meshing with a gear 22 fixed on a shaft 23 suitably journaled in the housing 10. I have shown a V-pulley 25 carried by the output shaft 24, but it will be obvious that the shaft 24 may be connected in any suitable manner to drive any desired mechanism.

A ball bearing 26 is mounted in one wall of the housing 10 to support the shaft 11, and a suitable oil sealing cap 27 is associated therewith. Concentric with the shaft 11 is a thimble 28, secured to the outer surface of the wall of the housing 10 by any desired fastening means such as the cap screws 29. Said thimble 28 is internally threaded as at 30 for a reason which will appear as the description proceeds.

Adjacent its root, the thimble 28 is formed with an externally threaded enlargement 31 formed, about its external periphery, with a series of peripherally and axially spaced sockets 32 for alternative reception of a set screw 33 received in a threaded socket 34 in a collar 35 threadedly and axially adjustably mounted upon the threads of said thimble enlargement 31. Carried by the collar 35 and projecting forwardly therefrom is a stop pin 36 for a purpose which will later appear.

A sleeve 37 is formed with a shank 38 externally threaded as at 39, the threads 39 of the shank 38 being engaged with the internal threads 30 of the thimble 28. Obviously, as the sleeve 37 is rotated, the threads 30 and 39 cooperate to produce axial adjustment of the sleeve.

Adjacent its outer end, the sleeve 37 is formed with an enlargement 40 which is externally threaded as at 41 for the reception of an internally threaded collar 42 preferably formed integral with a hand wheel 43. The enlargement 40 is formed with a peripheral series of peripherally and axially spaced sockets 44 similar to the sockets 32, for the alternative reception of the nose of a set screw 45 carried in a threaded socket 46 formed in the collar 42.

It will be clear from the above description, that the collar 35 may be set in any one of a plurality of axially adjusted positions with respect to the thimble 28, and that the hand wheel 43 may be set in any one of a plurality of axially adjusted positions with respect to the sleeve 37.

Radially projecting inwardly from the inner periphery of the hand wheel 43 is a stop finger 47. Radially projecting outwardly from the outer end of the thimble 28 is a stop pin 48. It will be clear from an inspection of the drawing that, as the hand wheel approaches the position illustrated in Figs. 1 and 2, the path of the finger 47 will intersect the position of the pin 36, so that said finger will strike the pin 36, whereby further adjustment of the hand wheel 43 in the same direction will be prevented. Correspondingly, as the hand wheel approaches the opposite limit of its throw, the finger 47 will strike the rearward surface (as viewed in the drawing) of the pin 48 to stop further adjustment of the hand wheel in the latter direction. It will be clear that the opposing peripherally directed faces of the stop finger 47 will engage the respective stop pins 36 and 38, as distinguished from the axially directed faces of said stop finger, so that there will be no possibility of jamming of the hand wheel. It will also be clear that the particular position at which the sleeve 37 will be stopped at one limit of its throw will depend upon the position of axial adjustment of the collar 35 with respect to the thimble 28, while the particular position of adjustment at which the sleeve 37 will be stopped at the opposite limit of its throw, by engagement of the finger 47 with the stop pin 48, will depend upon the position of axial adjustment of the collar 42 with respect to the enlargement 40 of the sleeve 37.

The sleeve 37 is formed, at its outermost end, with an outwardly opening socket 49 receiving one race 50 of an antifriction thrust bearing, said race being held against axial movement in one direction with respect to the sleeve by its engagement with the base of the socket 49, and being held against relative movement in the opposite direction by a ring 51 suitably secured to the end of the sleeve 37.

To the outer end of the shaft 11 is fixedly secured a coned disc 52, while a mating coned disc 53, having a rearwardly projecting hub 54, is axially adjustably splined upon said shaft through the medium of one or more splines 55. Upon a surface 56, bounded at its outer end by a rearwardly facing shoulder, is mounted the second race 50' of the above-mentioned antifriction thrust bearing, said race 50' being held against axial movement with respect to the disc hub 54 by said shoulder and by a sleeve 58 abutting the rearward surface of the race 50' and secured to the hub 54 by one or more screws 59. A series of balls 57, received in suitable grooves in the races 50 and 50', act to prevent relative axial movement between the races 50 and 50'.

Thus, the sleeve 37 is secured against axial movement with respect to the disc 53, so that axial adjustment of the sleeve 37 will result in positive corresponding adjustment of the disc 53 in either direction.

Fixedly secured to the shaft 23, at a point axially offset from the position of the disc 52, and facing in the opposite direction with respect thereto, is a coned disc 60; and a mating coned disc 61 is axially slidably mounted upon the shaft 23 outwardly beyond said disc 60, said disc 61 being constantly urged toward the disc 60 by a spring 62 suitably confined between the disc 61 and abutment means carried by the shaft 23. An edge-active belt 63 provides a driving connection between the V-pulley formed by the discs 52 and 53 and the V-pulley formed by the discs 60 and 61. It will be obvious that, as the disc 53 is moved toward the left from its illustrated position, the belt 63 will be squeezed outwardly between the discs 52 and 53, thereby being drawn inwardly between the discs 60 and 61 to force the disc 61 toward the left against the tendency of the spring 62, thereby reducing the speed of the shaft 23 with respect to the speed of the shaft 11.

The left hand end of the shaft 23 is supported in an antifriction bearing 64 mounted in a housing 65 suitably secured to the wall of the casing 10 by cap screws 66 or other equivalent fastening means. Said housing 65 is formed to provide an oil-reservoir 67 for the lubrication of the bearing 64, said reservoir being supplied with lubricant from the inside of the casing 10 through the medium of a scoop 68 formed integral with the housing 65. When the casing 10 is mounted in a position such that the shaft 23 is located vertically above the shaft 11, the housing 65 will be mounted in the position illustrated; but when the casing 10 is mounted with the shafts 11 and 23 located in a common horizontal plane, the housing 65 will be mounted in a position rotated 90° about its own axis, so that the lip 68 is disposed immediately below the shaft 23.

The operation of the unit will be clear. When the discs 53 and 61 are moved to their intermediate positions, so that the speed of the shaft 23 is equal to the speed of the shaft 11, the output shaft 24 will be stationary, because the shaft 11 will be rotating the gear 16 in one direction at the same speed at which the shaft 23 will be rotating the gear 20 in the opposite direction. Now, as the disc 53 is moved toward the left, the speed of the shaft 23 will be increased, whereby the shaft 24 will be rotated, through the differential mechanism, in a direction opposite to the direction of rotation of the shaft 11. Obviously, the speed of rotation of the shaft 24 in such direction will be increased as the disc 53 is moved farther and farther toward its left hand position. Conversely, if the disc 53 is moved toward the right from its intermediate position, the speed of the shaft 23 will be reduced below the speed of the shaft 11, whereby the shaft 24 will be rotated, at a speed dependent upon the degree of adjustment of the disc 53 toward the right beyond its intermediate position, in the direction of rotation of the shaft 11.

I claim as my invention:

1. For use with a shaft and a pair of coned discs associated with said shaft, one of said discs being axially shiftable toward and away from its fellow, a threaded element concentric with said shaft and axially fixed with respect to the other of said discs, a member threadedly engaged with said element, means providing a positive axial connection between said member and said adjustable disc, said member being rotatable relative to said element to shift said adjustable disc positively in either axial direction relative to its fellow, and stop means carried by said element and positioned at axially spaced points in the path of means moving with said member to limit the degree of axial adjustment of said adjustable disc in both directions, at least one of said stop means being axially adjustable with respect to said element.

2. For use with a shaft and a pair of coned discs associated with said shaft, one of said discs being axially shiftable toward and away from its fellow, a threaded element concentric with said shaft and axially fixed with respect to the other of said discs, a member threadedly engaged with said element, means providing a positive axial connection between said member and said adjustable disc, a hand wheel axially adjustably secured to said member for rotating said member relative to said element to shift said adjustable disc positively in either axial direction, a finger on said hand wheel and projecting radially therefrom, and stop means carried by said element at axially spaced points and projecting into the path of said finger to limit the degree of axial adjustment of said adjustable disc in both directions.

3. For use with a shaft and an element axially shiftably mounted to rotate with said shaft, means for axially adjusting the position of said element, comprising a threaded element concentric with said shaft and axially fixed with respect thereto, a member threadedly engaged with said threaded element, means providing a positive axial connection between said member and said shiftable element but permitting relative rotation therebetween, said member being rotatable relative to said threaded element to shift said shiftable element positively in either axial direction relative to said shaft, and stop means carried by said threaded element and positioned at axially spaced points in the path of means moving with said member to limit the degree of axial adjustment of said shiftable element in both directions.

4. For use with a shaft and an element axially shiftably mounted to rotate with said shaft, means for axially adjusting the position of said element, comprising a threaded element concentric with said shaft and axially fixed with respect thereto, a member threadedly engaged with said threaded element, means providing a positive axial connection between said member and said shiftable element but permitting relative rotation therebetween, a handwheel secured to said member for rotating said member relative to said threaded element to shift said shiftable element positively in either axial direction relative to said shaft, a finger on said handwheel and projecting radially therefrom, and stop means carried by said threaded element at axially spaced points and projecting into the path of said finger to limit the degree of axial adjustment of said shiftable element in both directions.

5. For use with a shaft and an element axially shiftably mounted to rotate with said shaft, means for axially adjusting the position of said element, comprising a first threaded element axially fixed with respect to said shaft, a second threaded element threadedly engaged with said first threaded element and axially fixed with respect to said shiftable element, a manipulating device axially adjustably secured to one of said threaded elements and provided with a finger projecting substantially radially toward the other of said threaded elements, a stop member carried by said other threaded element in the path of said finger, and a second stop member axially adjustably carried by said other threaded element in the path of said finger.

6. For use with a shaft and an element axially shiftably mounted to rotate with said shaft, means for axially adjusting the position of said element, comprising an internally threaded thimble concentrically surrounding said shaft adjacent said shiftable element and axially fixed relative to said shaft, a sleeve having an externally threaded shank threadedly engaged in said thimble, said sleeve being provided with an externally threaded enlargement, means providing an axially fixed connection between said sleeve and said shiftable element, a handwheel threadedly mounted on said sleeve enlargement, a collar threadedly mounted on said thimble, a radially projecting finger carried by said hand wheel, a stop member carried by said collar and disposed in the path of said finger to limit the throw of said shiftable element in one direction, and a stop member carried by said thimble at a point axially remote from said collar and disposed in the path of said finger to limit the throw of said shiftable disc in the opposite direction.

PAUL B. REEVES.